No. 830,234. PATENTED SEPT. 4, 1906.
H. W. KLEE & C. C. VAN EATON.
FRUIT SLICING MACHINE.
APPLICATION FILED OCT. 12, 1905.

2 SHEETS—SHEET 1.

Witnesses.
T. Castberg.
J. H. Morse.

Inventors
Henry W. Klee
Charles C. Van Eaton
By Geo. H. Strong. atty

No. 830,234. PATENTED SEPT. 4, 1906.
H. W. KLEE & C. C. VAN EATON.
FRUIT SLICING MACHINE.
APPLICATION FILED OCT. 12, 1905.
2 SHEETS—SHEET 2.
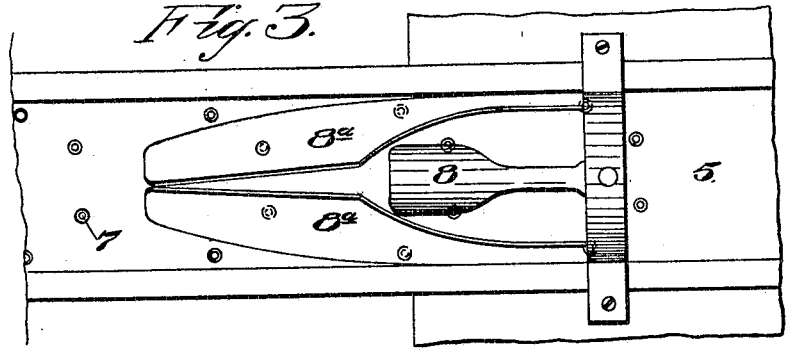
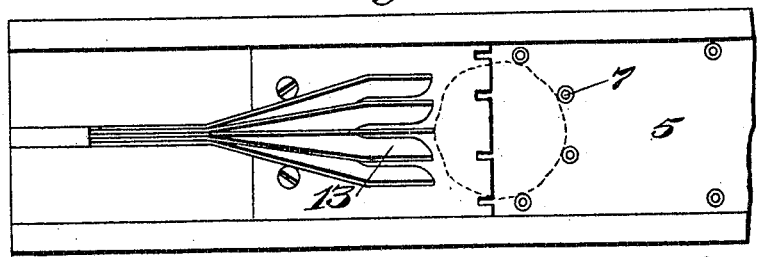
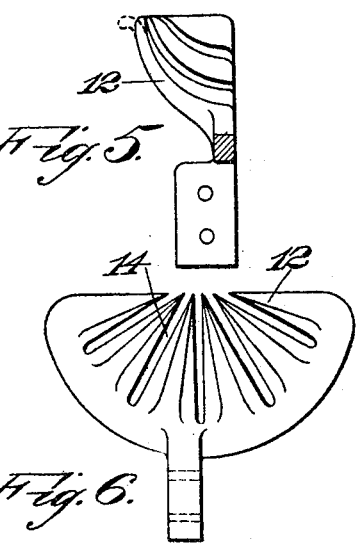
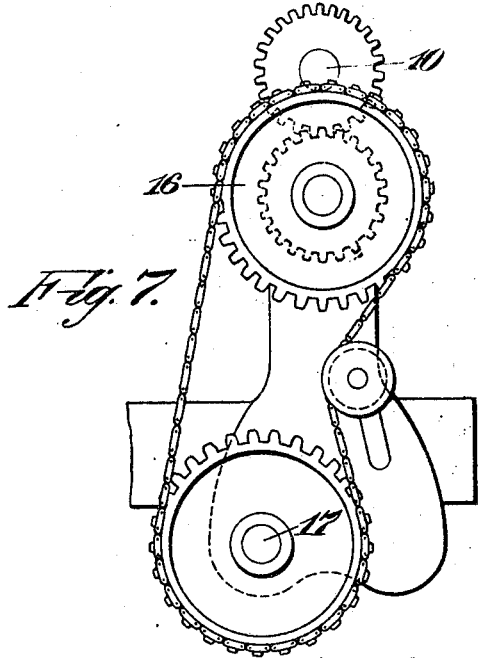

UNITED STATES PATENT OFFICE.

HENRY W. KLEE AND CHARLES C. VAN EATON, OF HAYWARD, CALIFORNIA, ASSIGNORS OF ONE-THIRD TO HUNT BROTHERS COMPANY, OF SAN FRANCISCO, CALIFORNIA, A CORPORATION.

FRUIT-SLICING MACHINE.

No. 830,234.        Specification of Letters Patent.        Patented Sept. 4, 1906.

Application filed October 12, 1905. Serial No. 282,403.

*To all whom it may concern:*

Be it known that we, HENRY W. KLEE and CHARLES C. VAN EATON, citizens of the United States, residing at Hayward, in the county of Alameda and State of California, have invented new and useful Improvements in Fruit-Slicing Machines, of which the following is a specification.

This invention relates to a machine for slicing fruit.

It consists in the combination of devices whereby the fruit is delivered to knives which slice it into as many sections as may be desired.

It also comprises details of construction, which will be more fully explained by reference to the accompanying drawings, in which—

Figure 1:
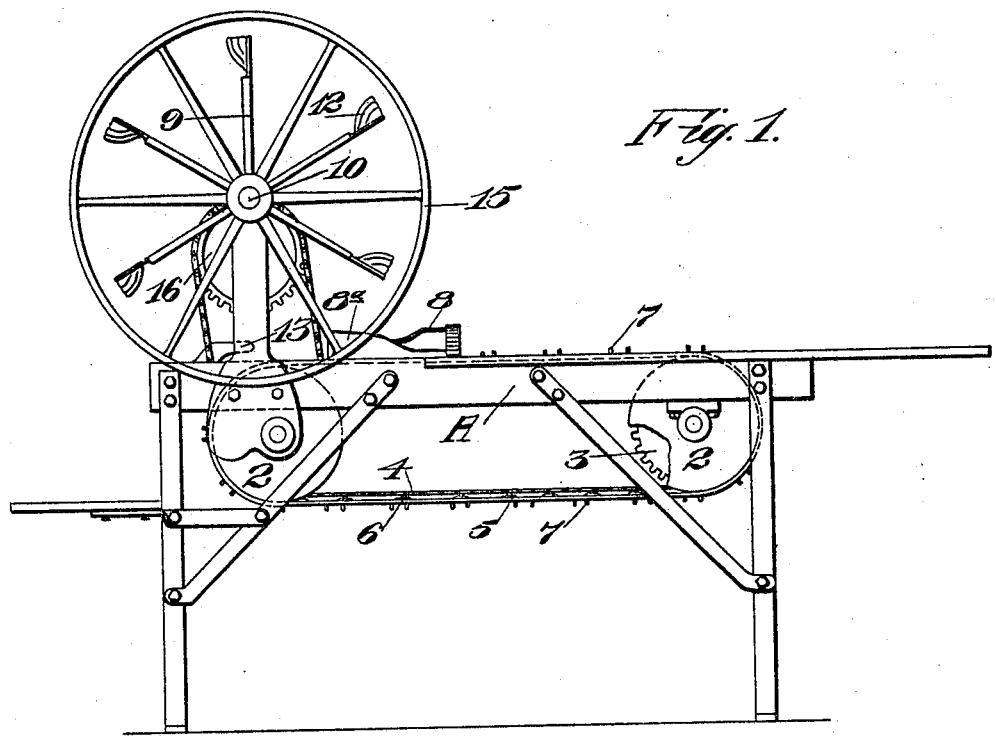
Figure 2:
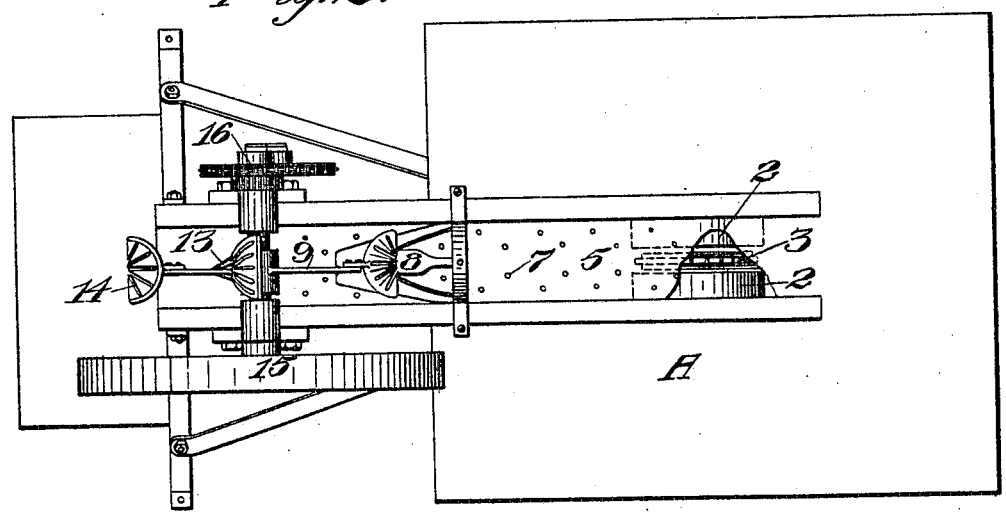

Figure 1 is a side elevation of our fruit-slicing machine. Fig. 2 is a plan view of same. Fig. 3 is an enlarged view of the elastic adjusting-blades. Fig. 4 is an enlarged view of the radial slicing-knives. Fig. 5 is a central section through Fig. 6. Fig. 6 is a plan view of the segment and fingers. Fig. 7 shows the gearing which drives the belt-pulleys 2.

In the preparation of peaches and other fruits for canning the fruit may first be peeled after having been pitted and cut in separate halves, peaches being a fruit which illustrate the character of the work to be done. After these preliminary processes it is desirable to slice the halves into a number of finer slices.

It is the object of this invention to provide an apparatus for this purpose.

As shown in the drawings, the apparatus may be mounted upon any suitable frame or table, as at A. This table may be of any suitable or desired length, and near opposite ends are belt-carrying pulleys 2. These pulleys are here shown as being mounted upon a shaft which also carries a sprocket-wheel 3, disposed between the two pulleys, and by means of a chain 4, passing around these sprocket-wheels, power is transmitted to drive the belt 5, which has a width sufficient to extend over the two outside pulleys 2. It will be seen that by this construction the center of the belt passes over the sprocket-wheel 3. This sprocket-wheel is of slightly-smaller diameter than that of the pulleys 2, and each link of the belt carries a tabular surface 6, and these surfaces are of such height that they present practically the same diameter for all as the diameter of the pulleys 2. Thus the central portion of the carrying-belt will be supported upon these tabular surfaces and may be maintained substantially level from side to side.

In the belt are fixed a number of pins, as 7. These pins are disposed in a segmental fashion upon the belt and adapted to substantially fit the curvature of a section of a peach when the latter is laid upon the belt with the convex side upward and the rear curved edge substantially engaging these pins. Four of these pins are here shown at each point, and the sets of pins are sufficiently separated to allow a segment of a peach or other fruit to be laid upon the belt and in front of each set of pins. The belt being driven, as will be hereinafter described, these peach-sections will be carried forward to the point where they pass between elastic adjusting-blades 8 and segments 8ª. These blades serve to center the fruit sections upon the belt and correct any errors in placing them upon the belt, the sections being laid upon the belt by attendants.

9 represents radial arms carried by a shaft 10, to which they are fixed and to which power is transmitted to revolve these arms. The outer ends of the arms have fixed to them radiating fingers 12, curved to approximately correspond with the convexity of the fruit. The inner ends of the fingers approach the belt upon which the fruit sections are being carried, and as the latter emerge from the guiding device 8 8ª the fingers will engage the curved exterior of the fruit and carry them forward.

Fixed in suitable relation with the traveling belt are a series of radially-disposed cutting knives or blades 13.

The hemispherical segment which carries the fingers 12 is also slotted between these fingers, as shown at 14, and these slots are so disposed that as the fingers sweep the fruit forward against the slicing-blades 13 these blades will pass through the slots 14, thus allowing the carrying-arms 9 and the fingers at their ends to be revolved without contact with the blades. Each section of fruit brought forward by the blade is thus first centered by the device 8 8ª, then swept forward by the fingers 12 across the divergent blades 13, which radiate as from the center of the fruit outwardly, and when the fruit has passed these blades it is cut into as many slices as there may be blades and is then in readiness for further operation.

Power to drive the mechanism may be transmitted in any suitable manner. As here shown a belt-pulley 15 is fixed to the shaft 10, and this revolves the radial arms and carriers 9. By a train of gearing 16 power is transmitted from this shaft to drive the shaft 17, upon which the contiguous sprocket-wheel 3 is fixed and through which power is transmitted to drive the belt-pulleys 2. The proportion of the gearing will be such that the proper relative rate of speed will be maintained, so that each of the arms 9 with its carrier will meet and advance a section of the fruit which is brought to it by the pins 7 upon the belt.

It will be understood that the carrying-arms 9 are so disposed with relation to the end of the belt 5 that the latter will have begun to pass around its pulleys, so that the pins which are in front of each section of fruit will have become sufficiently depressed to allow the fruit to be swept off without contacting with the pins in front.

Having thus described the invention, what we claim, and desire to secure by Letters Patent, is—

1. An apparatus for slicing fruit having in combination a traveling belt with projections against which the curved surfaces of halved fruit are placed, knives fixed contiguous to the end of the belt and arranged substantially in the plane of the upper run of said belt, and fingers pivoted above the belt and operable to engage the fruit while the latter is supported on the belt, whereby said fingers sweep the fruit from the belt and into direct contact with the knives.

2. An apparatus for slicing fruit having in combination a traveling belt with transversely-curved projections forming seats for the curved surfaces of halved fruit, blades disposed relative to the delivery end of the belt and arranged substantially in the plane of the upper run of said belt, whereby the fruit sections are centered on the belt, sweeps revoluble from a point above the belt and having fingers adapted to engage the fruit sections while the latter are supported on the belt, to sweep said fruit sections in the direction of the travel of the belt, and radial knives at the end of the belt and in the range of action of the fingers whereby the latter deliver the fruit sections directly from the centering-blades to the radial knives, to cut the fruit into slices.

3. A fruit-slicing apparatus comprising a traveling belt having upon its surface curved seats adapted to fit the outline of the fruit sections and against which said sections are placed, knives radially disposed contiguous to the end of the belt, said knives being arranged substantially in the plane of the upper run of the belt, arms radially disposed upon a revoluble shaft above the belt, segmental sweeps fixed to the arms having elastic fingers adapted to sweep along the upper run of the belt to advance the fruit forward against the knives, said fingers having open interspaces through which the knife-blades pass.

4. In an apparatus for slicing fruit, a horizontally-traveling belt having curved seats upon its surface against which fruit sections are placed, elastic guides arranged above an intermediate part of the belt, between which the fruit sections pass to correct their positions on the belt, radially-disposed knives fixed contiguous to the end of the belt, said knives being disposed substantially in the plane of the upper run of the belt, a sweep mounted upon a revoluble shaft above the belt having elastic fingers adapted to engage the fruit sections held by the guides and advance the fruit sections therefrom and force them across the knife-edges, driving mechanism and coördinating gear connections so disposed that the belt presents a fruit section to each carrier at the proper moment.

In testimony whereof we have hereunto set our hands in presence of two subscribing witnesses.

HENRY W. KLEE.
CHARLES C. VAN EATON.

Witnesses:
W. J. RAMAGE,
JOHN FORTH.